US010783167B1

(12) United States Patent
Dutta et al.

(10) Patent No.: US 10,783,167 B1
(45) Date of Patent: Sep. 22, 2020

(54) SYSTEM FOR CLASSIFYING ITEMS BASED ON USER INTERACTIONS

(71) Applicant: AMAZON TECHNOLOGIES, INC., Seattle, WA (US)

(72) Inventors: Archiman Dutta, Shoreline, WA (US); Meghana Shivanand Rajamane, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 660 days.

(21) Appl. No.: 15/244,320

(22) Filed: Aug. 23, 2016

(51) Int. Cl.
*G06F 40/117* (2020.01)
*G06F 16/28* (2019.01)
*H04L 29/08* (2006.01)
*G06F 16/2457* (2019.01)

(52) U.S. Cl.
CPC ...... *G06F 16/285* (2019.01); *G06F 16/24578* (2019.01); *H04L 67/22* (2013.01)

(58) Field of Classification Search
CPC .......... G06F 17/3071; G06F 17/30864; G06F 17/30598
USPC ...................................................... 707/737
See application file for complete search history.

(56) References Cited

U.S. PATENT DOCUMENTS

| 6,947,936 | B1* | 9/2005 | Suermondt | G06F 16/353 |
| 2007/0239745 | A1* | 10/2007 | Guerraz | G06K 9/6219 |
| 2008/0091549 | A1* | 4/2008 | Chang | G06Q 30/0269 705/14.66 |
| 2008/0282198 | A1* | 11/2008 | Brooks | G06F 16/9562 715/854 |
| 2009/0006285 | A1* | 1/2009 | Meek | G06Q 10/10 706/12 |
| 2009/0276437 | A1* | 11/2009 | Weinstein | G06F 16/48 |
| 2010/0306282 | A1* | 12/2010 | Bennett | G06N 5/02 707/803 |
| 2012/0173551 | A1* | 7/2012 | Haddorp | G06F 16/907 707/751 |

* cited by examiner

*Primary Examiner* — Hosain T Alam
*Assistant Examiner* — Robert F May
(74) *Attorney, Agent, or Firm* — Lindauer Law, PLLC

(57) ABSTRACT

Described are techniques for modifying or creating classification data used to automatically classify items in an online marketplace or catalog, based on user interaction data. For one or more classification labels that may be applied to an item, user interaction data indicative of a count of instances that the label was accessed, a length of time during which the label was accessed, counts of instances that parent and child labels were accessed, and counts of instances that the label was accessed via a search query may be determined. Based on the user interaction data, an importance score for the label may be determined. Labels having an importance score greater than or equal to a threshold value may be included in classification data and used for subsequent classification of items. Labels having an importance score less than a threshold may be excluded from the classification data.

20 Claims, 8 Drawing Sheets

US 10,783,167 B1

SYSTEM FOR CLASSIFYING ITEMS BASED ON USER INTERACTIONS

BACKGROUND

To facilitate location of different types of items within an online marketplace or catalog, items may be classified using a structure of labels, such as a hierarchical tree.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1A:
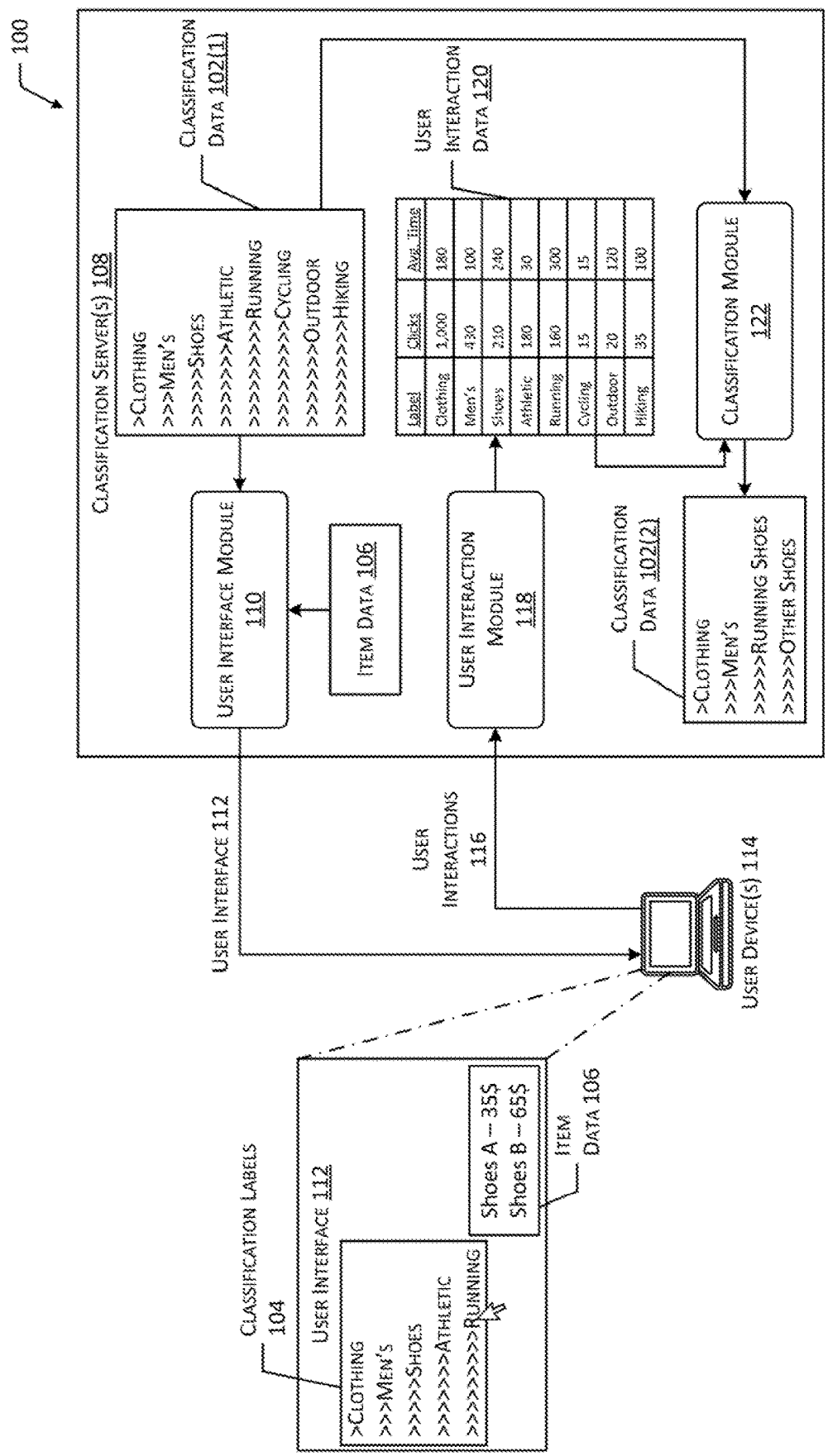
FIG. 1A depicts an implementation of a system that may be used to determine classification data to be used for classification of items.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Online marketplaces and catalogs that offer a large number of items for purchase may sort the items into various categories to facilitate location of the items by users. In some cases, each category may include one or more sub-categories, which in turn may also include sub-categories, such that the items are classified using a hierarchical tree structure. For example a user searching for men's formal shoes may access a first node of a tree related to clothing and fashion, a second node related to men's clothing, a third node related to shoes, and a fourth node related to formal shoes. As another example, a user searching for women's boots may access the first node related to clothing and fashion, a second node related to women's clothing, a third node related to shoes, and a fourth node related to boots. In some cases, a user accessing the various labels of a classification tree may also supply a search query, which may be used to filter the labels and items presented to the user or to bypass certain labels to access sub-labels that correspond to the search query.

Due to the large quantity of items available through online marketplaces and similar entities, an online marketplace may use an automated process to classify and apply labels to newly-added items. For example, item data associated with a pair of men's running shoes may indicate characteristics that correspond to various hierarchical labels within a classification tree, such that the running shoes may be automatically classified within a node of the tree where other similar items are also classified. However, in some cases, a classification structure may include similar or redundant labels or hierarchies. For example, an online catalog may include running shoes classified within a first hierarchy of nodes—fashion, men's fashion, shoes, and athletic shoes—as well as a second hierarchy of nodes—sporting equipment, shoes, running shoes, and men's running shoes. Due to a complex hierarchy of redundant nodes, an automated classification process may inaccurately classify new items or classify new items in a confusing manner that generates an adverse customer experience. As another example, a classification structure may include very similar nodes, such as separate labels for toy action figures and bendable action figures. An automated classification process may inaccurately classify items using these labels due to the similarities in the item data associated with such items.

Described in this disclosure are techniques for modifying the classification structure into which new items are automatically classified based on user interactions, which may indicate the specific classification labels that are important or useful to customers, and the labels that are less useful, redundant, or erroneous. Classification data, used to automatically or manually classify items, may include various labels that may be associated with the items. For example, the classification data may include a hierarchical tree of labels. A parent label may indicate a broad category applicable to a large number of items, such as "Clothing", while a child label associated with the parent label may include a sub-category of items, such as "Shoes". Additional child labels may indicate more specific sub-categories, such as "Running Shoes". To facilitate location of items, at least a subset of the labels may be accessible to users. For example, a user may be presented with a user interface displaying one or more parent labels. The user may select the label "clothing", responsive to which various child labels associated with the clothing label may be output to the user. The user may then select the label "shoes", responsive to which child labels associated with the shoes label may be output, and so forth. In some implementations, item data associated with one or more items associated with a selected label may also be presented. For example, after selecting the label "shoes", a user may be presented with item data associated with a large number of items, each associated with the shoes label. Then, after selecting the label "running shoes", the user may be presented with item data associated with a smaller number of items—the items associated with both the shoes and running shoes labels.

User interaction data associated with the labels may be used to determine the importance, accuracy, or utility of the labels. For example, the user interaction data for a particular label may indicate a count of instances that user input selecting that label was received. The user interaction data may also indicate counts of instances that user input selecting one or more parent or child labels associated with the particular label was received. In some implementations, the user interaction data may indicate a length of time during which one or more users interacted with the particular label, such as a dwell time or a viewing time during which a user interface associated with the particular label was displayed. In other implementations, the user interaction data may indicate a manner in which the particular label was accessed. For example, a user may access a particular label by first selecting a parent label, then the particular label. In other cases, the user may provide a search query responsive to which the particular label may be provided as one possible output.

The user interaction data may be used to determine an indication of importance or usefulness associated with at least a subset of the labels. For example, a large count of instances that a label was selected may indicate a high degree of importance or usefulness. Similarly, a large length of time spent by users accessing a label may indicate a high degree of importance or usefulness. Conversely, a small count of accesses or a short length of time spent accessing a label may indicate low importance or usefulness. In some implementations, the user interaction data may be used to generate an importance score for one or more of the labels. Labels that have an associated importance score greater than a threshold value may be included as classification data. The classification data may be used for automatic classification of subsequent items that are added to a marketplace or catalog. For example, item data associated with a newly-added item may indicate characteristics of the item. Based on correspondence between the item data and at least a subset of the labels included in the classification data, those labels may be applied to the item to classify the item.

In some implementations, the user interaction data may be used to add, remove, or reorganize labels within the classification data. For example, if a count of instances that users access a child label is within a threshold quantity or percentage of a count of instances that user's access a parent label, this may indicate that the child label is of greater importance the parent label. Continuing the example, if eighty percent of the users that access the "Shoes" parent label also access the "Running Shoes" child label, while a very small number of users access other child labels associated with the shoes parent label, this user interaction may indicate that the majority of users seeking to purchase shoes are primarily interested in running shoes, while the shoes parent label and other child labels associated with the shoes label are of lesser importance. Based on this determination, one or more of the other child labels may be removed from the classification data, or the shoes parent label may be removed from the classification data. In other cases, the classification data may be reorganized based on the relative importance of the labels. For example, the classification data may be modified such that the running shoes label is a parent label, while "other shoes" is a child label associated with the running shoes label.

In some implementations, modifications to the classification data may be suppressed from output to users. For example, the classification data may be used to automatically classify items by associating labels therewith, while users may view a fixed set of labels independent of the classification data. In such a case, the labels output to users may be mapped to different labels associated with the classification data. In other implementations, modifications to the classification data may be output to users. For example, as user interactions change over time, the labels that are presented for access by users may be modified. Continuing the example, during spring and summer months, labels associated with swimwear and summer clothing may receive a larger number of accesses than labels associated with winter clothing. Based on this user interaction data, users may be provided with a classification hierarchy in which labels associated with summer clothing are presented at higher levels in the classification hierarchy than labels associated with winter clothing.

In some implementations, user interaction data may be used to determine labels or items that include potentially inaccurate classifications. For example, if the length of time that users spend interacting with an output received responsive to selecting a label is less than a threshold value, this interaction may indicate that users who access the label are quickly navigating to other content rather than using the output. This interaction may occur if the items associated with a label are wrongly classified or if the content associated with the label is not useful to users for other reasons. Responsive to this user interaction, a notification associated with the label may be generated. For example, the notification may request human intervention by an administrator or other user associated with the classification data to determine whether items are improperly classified using the label or whether the label is potentially not useful for other reasons. The potentially erroneous label may be excluded from use classifying subsequent items until user input responsive to the notification is received. In some implementations, item data associated with the items classified using the label may also be accessed. Based on the item data, it may be determined whether the items associated with a particular label are homogeneous or heterogeneous. For example, if all items associated with the "shoes" label include shoes, the items would be homogeneous. However, if some of the items include socks, the items would be heterogeneous. The determination of heterogeneous items associated with labels where homogenous groups of items would be expected may also indicate that one or more items have been improperly classified, reducing the usefulness of the label to users.

In some implementations, user interaction data may be used to generate customized classification hierarchies for particular groups of users. For example, user interaction data may also include demographic data indicating characteristics of the users accessing particular labels. Continuing the example, demographic data may indicate that ninety-eight percent of users accessing a label associated with dishwasher drain plates are male, while female users that access this label do not interact with the resulting output for a significant length of time. Based on this data, the label associated with dishwasher drain plates may be determined to be of use or interest to male users, but of relative disinterest to female users. Subsequent male users that access the labels may be presented with a user interface that includes a label associated with dishwasher drain plates, while this particular label may be omitted from output when a female user accesses the labels. As another example, demographic data may indicate that users residing in Arizona during summer months consistently access labels associated with replacement parts for vehicle cooling systems, while users residing in Maine rarely access these labels. Based on this data, subsequent users that reside in Arizona may be presented with a user interface including such labels, while users in other regions may not.

By determining the particular classification labels that are useful or interesting to users, based on user interactions with the labels, the classification data used to apply labels to newly-added items may be streamlined. For example, by restricting the classification data to labels having a threshold importance score, determined based on user interactions, items may be automatically classified using labels that are more likely to be accessed by users, thereby providing a simplified user interface that improves user experiences and increase the likelihood that a user may locate and purchase items of interest. For example, a simplified user interface presented to a user may enable a user to simultaneously view a hierarchy of classification labels that, based on user interactions, have been determined to be of user or interest to a large number of users, alongside item data associated with items that pertain to selected classification labels. This may improve the ability of a computing device to present information and interact with a user by facilitating the ability of the user to quickly and accurately make purchasing decisions. Additionally, by excluding less useful, redundant, or erroneous labels from the classification data, the accuracy and efficiency of an automated classification process may be improved, enabling items to be classified using less processing time and other computing resources, improving the overall speed of the system.

FIG. 1A depicts an implementation of a system 100 that may be used to determine classification data 102 to be used for classification of items. Classification data 102 may include a plurality of classification labels 104 which may be applied to items. For example, classification labels 104 may include alphanumeric descriptors, images, or other types of data that may be used to differentiate particular types of items from other types of items. Continuing the example, classification labels 104 may include labels such as "Clothing", which may differentiate clothing-type items from other types of items, "Men's", which may differentiate men's clothing items from women's or children's clothing items, "Shoes", which may differentiate footwear from other types of clothing, and so forth. The classification labels 104 may include parent labels, indicative of categories of items, such as heterogeneous types of clothing, and child labels, indicative of sub-categories of items, such as shoes. Additional child labels may in turn be associated with the child labels, indicating additional categories of items, such as "Athletic" to differentiate athletic shoes from other types of shoes, such as outdoor shoes, and "Running" and "Cycling" to differentiate running shoes and cycling shoes from other types of athletic shoes. FIG. 1A also depicts example classification labels 104 such as "Outdoor", to differentiate outdoor shoes from other types of shoes, and "Hiking" as one particular sub-category of outdoor shoes.

FIG. 1A depicts example classification data 102(1) that includes multiple classification labels 104 that may be part of a larger classification hierarchy. For example, while the example classification data 102(1) includes eight classification labels 104 that relate to different types of clothing and shoes, other classification labels 104 may be associated with different types of shoes, different types of clothing, or different types of non-clothing items. The classification data 102(1) may be used to classify items by applying particular classification labels 104 to particular items. For example, item data 106 indicative of characteristics of particular items may include an indication of one or more of the classification labels 104. The classification data 102(1) and item data 106 may be stored in association with one or more classification servers 108 or other types of computing devices. A user interface module 110 associated with the classification server(s) 108 may be used to generate a user interface 112 based on the classification data 102(1) and the item data 106. The user interface 112 may be provided to one or more user devices 114 for presentation. For example, the user interface 112 may present at least a portion of the classification labels 104 on a display or other type of output device. As user input is received, selecting or otherwise interacting with one or more of the classification labels 104, additional classification labels 104 may be displayed. For example, the user interface 112 may present multiple parent labels, such as "Clothing" alongside other labels. Selection of the clothing label may cause child labels associated with the clothing label, such as "Men's", to be displayed alongside other child labels associated with women's or children's clothing. Additional user input selecting labels may cause additional child labels to become accessible.

In some implementations, selection of one or more of the classification labels 104 may also cause item data 106 for the items associated with the selected classification label(s) 104 to be displayed. For example, selection of the "Running" label may cause item data 106 associated with different types of running shoes to be displayed in the user interface 112. In some cases, the classification labels 104 may function as a filter. For example, selection of the "Shoes" label may cause item data 106 for a large number of items associated with this classification label 104 to be displayed. Selection of the "Running" label may cause one or more of the items to be removed from display, such that only the items associated with the running label are presented in the user interface 112.

The classification server(s) 108 may determine user interactions 116, such as user input and interactions with the user interface 112. Specifically, a user interaction module 118 associated with the classification server(s) 108 may determine the user interactions 116 and store at least a portion of the user interactions 116 as user interaction data 120. User interactions 116 may include selection, access, or other types of interaction with particular classification labels 104. For example, the user interaction data 120 may indicate a number of times that one or more classification labels 104 were selected using a mouse device or other type of input device (e.g., "Clicks"). User interactions 116 may also include other indications of interactions with particular classification labels 104 such as the length of time that one or more users spend viewing or interacting with content presented in the user interface 112. For example, the user interaction data 120 may include an average length of time (e.g., "Avg. Time") spent by users that selected the "Running" label, during which the users viewed or otherwise interacted with item data 106 or other classification labels 104 presented in the user interface 112. An average length of time may include a mean, mode, or median amount of time. For example, the average length of time may include a median time associated with the fiftieth percentile of users. Other user interactions 116 may include use of search queries or other features presented in the user interface 112. For example, in some cases, a user may access a particular classification label 104 subsequent to providing a search query, while in other cases, the user may access the particular classification label 104 by first selecting one or more other classification labels 104 until the particular classification label 104 becomes accessible.

The user interaction data 120 may be used to determine particular classification labels 104 that are useful or interesting to users, and classification labels 104 that are not of use or interest. For example, classification labels 104 that are accessed a large number of times or that are accessed for a significant length of time may be of high use, while classification labels 104 that are accessed a small number of times or for a short length of time may be of low use. As another example, classification labels 104 that are accessed directly, such as by navigating the user interface 112 through selection of the classification labels 104 may be of greater use or interest than classification labels 104 associated with a search query. In some cases, the relationships between classification labels 104 may also be used to determine the usefulness thereof. For example, if a large portion of users that access a parent label then subsequently access a particular child label, within a short length of time, the parent label may be of low use or interest, while the child label is of higher use or interest. In some implementations, user interaction data 120 may also include an indication of times at which particular user interactions 116 occurred. For example, when determining whether a particular classification label 104 is of interest or use based on previous user interaction data 120, user interactions 116 that occurred during a time period similar to the current time may have a greater weight than other user interactions. Continuing the example, due to seasonal variations in user interactions 116, during summer months, user interaction data 120 associated with previous summer months may have a greater weight than user interaction data 120 associated with other time periods.

A classification module 122 associated with the classification server(s) 108 may modify the classification data 102(1) based on the user interaction data 120. For example, if the number of accesses for the "Running" child label is at least 85 percent as large as the number of accesses for the "Athletic" parent label, this may indicate that the athletic label is not useful to users, because the majority of users searching for athletic shoes are searching for running shoes. If the number of accesses for the "Running" label is at least 75 percent as large as the number of accesses for the "Shoes" parent label, this may indicate that a significant portion of the users searching for shoes are searching for running shoes. If the number of accesses for the "Cycling", "Outdoor", and "Hiking" labels are below a threshold value, this may indicate that these labels are of limited use or interest to users. In some implementations, the user interaction data 120 may be used to generate an importance score associated with each classification label 104, and the importance score may be compared with a threshold score. In other implementations, specific elements of the user interaction data 120 may be compared with one or more threshold values for these elements.

Based on the user interaction data 120 and one or more threshold values, algorithms, importance scores, and so forth, the classification module 122 may generate a modified set of classification data 102(2) based on the initial classification data 102(1). FIG. 1A depicts the modified classification data 102(2) including the labels, "Clothing", "Men's", "Running Shoes", and "Other Shoes". Use of the "Athletic" and "Shoes" labels, from the initial classification data 102(1) may be eliminated due to count of accesses for the "Running" label exceeding one or more thresholds relative to the count of accesses for the athletic and shoes labels. Due to the small number of accesses for the "Cycling", "Outdoor", and "Hiking" labels, use of these classification labels 104 may be eliminated in favor of the "Other Shoes" label.

In some implementations, the modified classification data 102(2) may be suppressed from output in a user interface 112. For example, users may continue to view and access the "Cycling", "Outdoor", and "Hiking" labels, however, these labels may be mapped to the "Other Shoes" label of the classification data 102(2). New items that are added to the online marketplace or catalog may be classified using the classification labels 104 or the classification data 102(2), such that the modified classification data 102(2), having a smaller number of classification labels 104, expedites the classification process and improves the accuracy thereof. In other implementations, one or more portions of the modified classification data 102(2) may be provided to the user interface 112. For example, the classification labels 104 associated with the modified classification data 102(2) may be output in place of the classification labels 104 associated with the initial classification data 102(1).

As additional user interactions 116 associated with the classification labels 104 are determined and stored as user interaction data 120, the classification module 122 may continue to modify the classification data 102(2). For example, as user interactions 116 change seasonally, the user interaction data 120 may indicate larger or smaller numbers of accesses for particular classification labels 104. Based on the user interaction data 120, the classification module 122 may add, remove, or reorganize the classification labels 104.

Figure 1B:
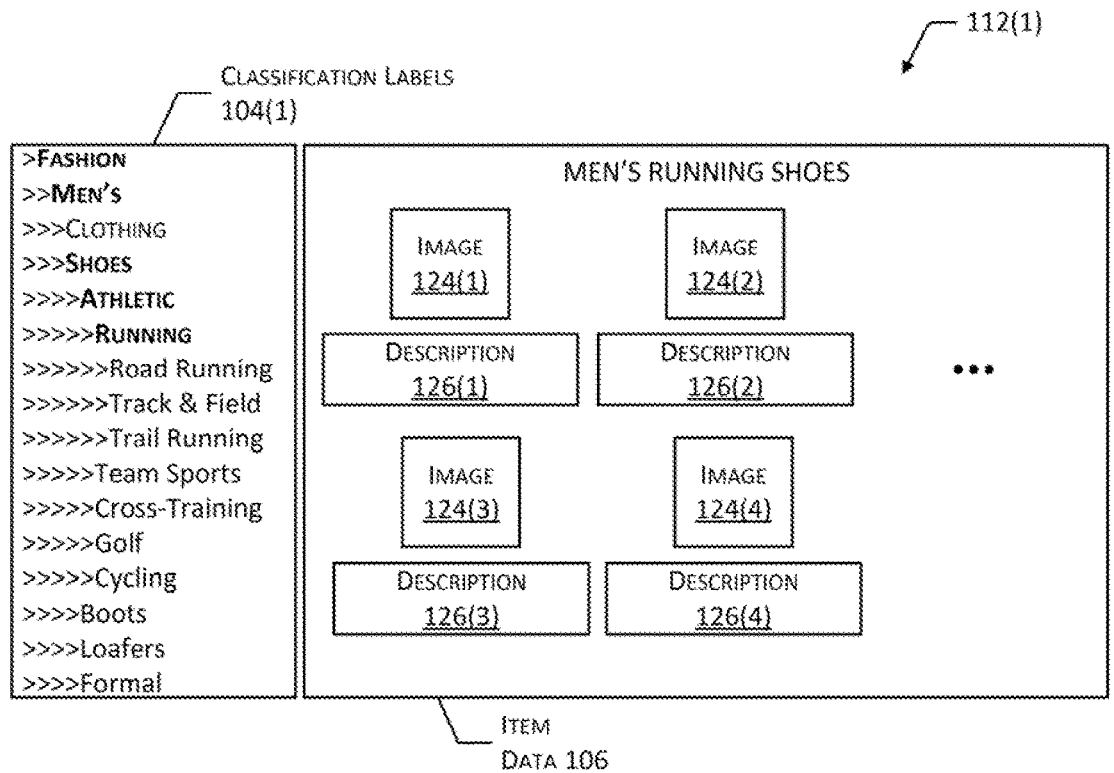
FIG. 1B depicts example user interfaces illustrating use of the system of FIG. 1A.

FIG. 1B depicts example user interfaces 112 illustrating use of the system of FIG. 1A. For example, a first user interface 112(1) may include a first section including a first set of classification labels 104(1) depicted adjacent to a second section depicting item data 106 associated with one or more items that correspond to selected labels from the set of classification labels 104(1). For example, the item data 106 may include images 124 and descriptions 126 of various items associated with selected classification labels 104. Continuing the example, a first user interface 112(1) may include a large number of classification labels 104(1) for selection by a user. Due to the large number of classification labels 104(1), a user of an e-commerce system may experience difficulty locating a particular label of interest, or may be uncertain regarding which of the particular labels within the set of classification labels 104(1) may include a particular type of item that the user is seeking. For example, a user intending to purchase a pair of men's running shoes may select a first classification label 104 associated with fashion-related items, a second classification label 104 associated with men's fashion items, a third classification label 104 associated with shoes, a fourth classification label associated with athletic shoes, and a fifth classification label associated with running shoes. The classification label 104 "Running" may in turn have multiple child labels associated therewith. Additionally, classification labels 104 relating to other types of athletic shoes may also possibly include items of interest to a user searching for running shoes, however the presence of classification labels 104 for four additional types of athletic shoes (e.g., "Team Sports", "Cross-Training", "Golf", and "Cycling) may prevent efficient searching, by a user, of each category of items.

FIG. 1B depicts a second user interface 112(2) that may be presented after use of the system 100 of FIG. 1A to modify the classification data 102. In the second user interface 112(2), a second set of classification labels 104(2) includes a smaller number of classification labels 104, which may facilitate more efficient and accurate purchasing decisions by users. For example, when using the second user interface 112(2) to access item data 106 associated with men's running shoes, a user may select classification labels 104 associated with fashion items, men's fashion items, and then running shoes. The smaller number of classification labels 104 within the second set may enable a user to more quickly and accurately locate items of interest, with less uncertainty regarding which classification labels 104 may apply to particular items. Additionally, a user may search for items of interest in other categories more efficiently by selecting from among the smaller number of other labels, such as the "Other Athletic Shoes" label. As such, generation of a user interface 112(2) using streamlined classification data 102 may improve the ability of a computing device to display information and interact with a user by facilitating the ability of the user to quickly and accurately make purchasing decisions when contemplating an online purchase or rental of an item, or acquisition of media content.

Figure 2:
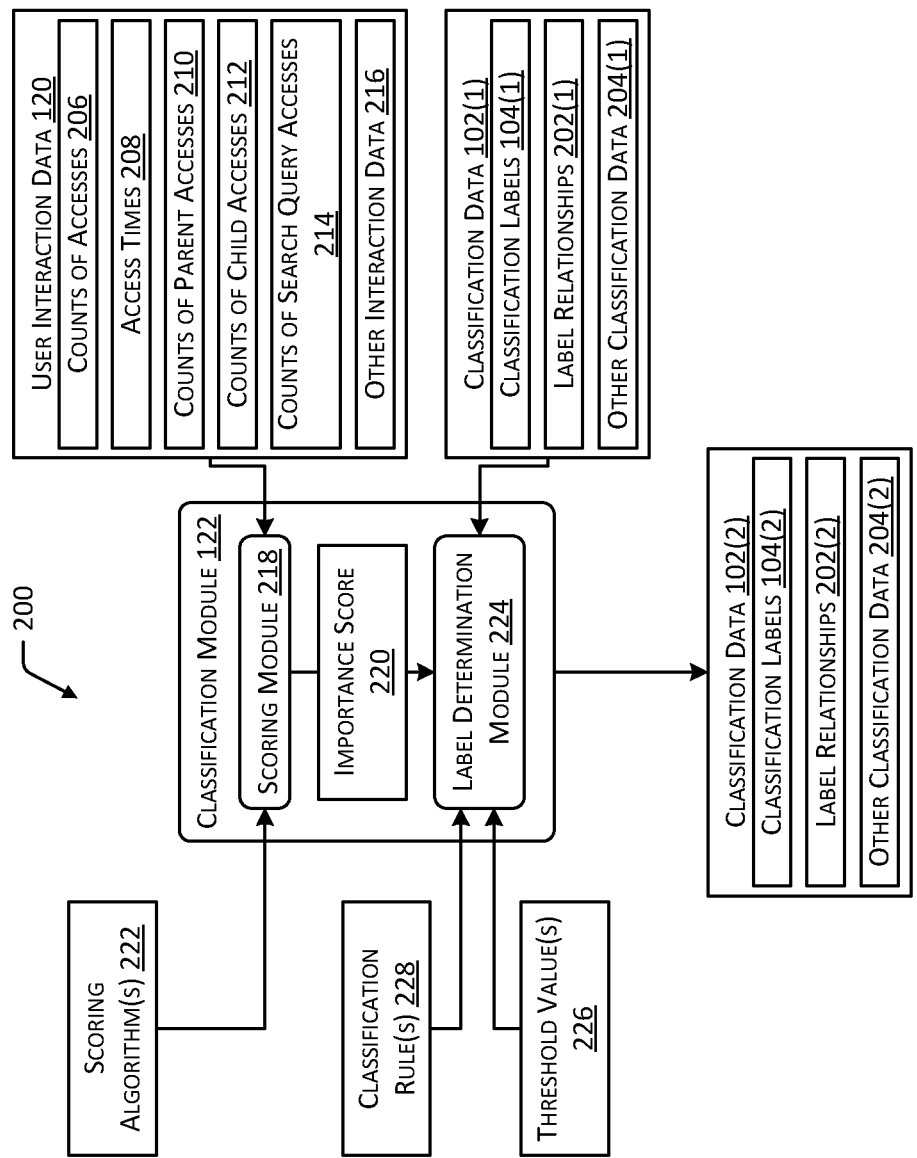
FIG. 2 is a block diagram depicting example classification data that may be modified using example user interaction data.

FIG. 2 is a block diagram 200 depicting example classification data 102(1) that may be modified using example user interaction data 120. As discussed with regard to FIG. 1A, classification data 102(1) may include one or more classification labels 104(1). Classification labels 104(1) may include alphanumeric data, audio data, image data, or other types of data that may be associated with items to facilitate differentiation of particular types of items from other types of items. For example, classification labels 104(1) may include text data that describes types of items, such as "Clothing", "Electronics", "Sporting Goods", and so forth. In some implementations, classification labels 104(1) may include metadata that may be determined by a computing device but may not necessarily be understandable to a human user. For example, the classification labels 104(1) may include flags, labels, field information, and so forth that is not output for access by a user, but that may be used by a computing device to classify and differentiate items from other items.

The classification data 102(1) may also include label relationships 202(1). For example, one or more of the classification labels 104(1) may be related to other classification labels 104(1) by a parent, child, or sibling relationship. Continuing the example, FIG. 1A depicts classification labels 104 in which the label "Clothing" is a parent label with regard to the label "Men's", which is in turn a parent label with regard to the label "Shoes", and so forth. The labels "Running" and "Cycling" are child labels with regard to the label "Athletic", and are sibling labels with regard to one another.

Other classification data 204(1) may include metadata, such as a history of previous modifications to the classification data 102(1) including, dates and times that such modifications occurred, particular users or user interaction data 120 that caused the modifications, and so forth. Other classification data 204(1) may also include indications of items with which particular classification labels 104(1) are associated, search queries or other user input that caused the output of particular classification labels 104(1) and so forth.

As discussed with regard to FIG. 1A, user interaction data 120 may include indications of user interactions 116 determined with regard to particular classification labels 104. For example, while FIG. 2 depicts a single set of user interaction data 120 that may be determined with regard to a particular classification label 104, similar sets of user interaction data 120 may be determined for any number of other classification labels 104. The user interaction data 120 may include a count of accesses 206 for a particular classification label 104. An access may include a selection of the classification label 104, such as by using a mouse device, touch sensor, keyboard, microphone, or other input device. In some implementations, an access may include use of a search query including terms that correspond to a particular classification label 104. For example, a search query containing the term "running shoes" may be included as an access associated with the classification label 104 "Running Shoes". Counts of accesses 206 for a particular classification label 104 may be used to determine a level of utility or interest associated with the particular classification label 104. For example, if a classification label 104 is accessed a large number of times, the classification label 104 may be more useful than another classification label 104 that is accessed a small number of times.

The user interaction data 120 may also include indications of access times 208 associated with a particular classification label 104. For example, when a user selects a particular classification label 104, a user interface 112 may be provided that includes additional classification labels 104 for access, such as child labels associated with the particular classification label 104. The user interface 112 may also include item data 106 indicative of one or more items associated with the particular classification label 104. An access time 208 may include a length of time that the user interface 112 is displayed or otherwise output before a user accesses a subsequent classification label 104, a portion of the item data 106, another element of the user interface 112, or until the user navigates away from the user interface 112 or discontinues the application that is displaying the user interface 112. The access times 208 may include an average time determined for multipole users. For example, multiple users may access the "Running Shoes" classification label 104, then browse the item data 106 associated with various running shoes items for an average time of 300 seconds. Access times 208 for a particular classification label 104 may be used to determine a level of utility or interest associated with the particular classification label 104. For example, if users interact with the content associated with a classification label 104 for a large length of time, the classification label 104 may be more useful than another classification label 104 associated with smaller access times 208.

User interaction data 120 may also include one or more counts of parent accesses 210, which may include a count of instances that a parent label associated with the particular classification label 104 was accessed. The user interaction data 120 may further include one or more counts of child accesses 212, which may include counts of instances that one or more child labels associated with the particular classification label 104 were accessed. The relationship between the count of accesses 206 for the particular classification label 104 and the accesses for parent and child labels may indicate the utility or interest associated with the particular classification label 104, the parent label, and the child label(s). For example, if the count of child accesses 212 exceeds the count of accesses 206 for the particular classification label 104, or is within a threshold quantity or percentage thereof, this may indicate that the majority of users that access the particular classification label 104 find greater utility or interest in the child label.

User interaction data 120 may further include counts of search query accesses 214 associated with a particular classification label 104. In some cases, a classification label 104 may be accessed directly, such as by accessing an online marketplace or catalog and selecting the classification label 104, or by selecting one or more other classification labels 104 which cause the particular classification label 104 to become accessible. In other cases, a classification label 104 may be accessed indirectly, such as by providing a search query having terms that may correspond to one or more classification labels 104. Counts of search query accesses 214 for a particular classification label 104 may indicate a level of utility or interest associated with at least a portion of the counts of accesses 206. For example, users that access a classification label 104 through a search query may be less interested in the particular classification label 104 than users that navigate to the classification label 104 by selecting links or other classification labels 104 within a user interface 112.

Other interaction data 216 may include counts of accesses for sibling labels or other classification labels 104 within the classification data 102. Other interaction data 216 may also include user data indicative of the user accounts accessing the classification labels 104 or demographic data indicative of characteristics of the users. For example, particular types of users may exhibit a tendency to access classification labels 104 in a particular manner, such as by using search queries, and to view content presented in a user interface 112 for a smaller length of time than other users. User data and demographic data may be used to modify the weight applied to particular accesses of a classification label 104 when determining the utility or interest associated with the classification label 104.

The classification module 122 of the classification server(s) 108 may be used to modify the classification data 102(1), to form modified classification data 102(2), based on the user interaction data 120. For example, the classification module 122 may include a scoring module 218, which may determine an importance score 220 indicative of the utility or importance associated with a particular classification label 104. The importance score 220 for a particular classification label 104 may be determined based on at least a portion of the user interaction data 120 for that classification label 104 and one or more scoring algorithms 222. The scoring algorithms 222 may indicate various weights and relationships between one or more elements of the user interaction data 120 that may be used to determine the importance score 220. For example, the scoring algorithms 222 may assign a weight of 10 to each access of the count of accesses 206 for a particular classification label 104 and a weight of 1 to each second of access time 208 associated with the particular label. The scoring algorithms 222 may further subtract a score of 5 for each count of search query accesses 214 for the particular classification label 104.

A label determination module 224 associated with the classification module 122 may determine the modified classification data 102(2) based on one or more of the importance score 220 or the user interaction data 120. For example, the label determination module 224 may determine correspondence between the importance scores 220 for various classification labels 104 and one or more threshold values 226. Classification labels 104 having an importance score 220 that exceeds a threshold value 226 may be included in the modified classification data 102(2). In some implementations, the label determination module 224 may access one or more classification rules 228 that indicate the manner in which the classification data 102(1) may be modified based on the user interaction data 120 and threshold values 226. For example, in some cases, generation of an importance score 220 may be omitted, and the classification rules 228 may relate to the user interaction data 120 directly. For example, the classification rules 228 may indicate that classification labels 104 having a count of accesses 206 or access time 208 that exceeds a threshold value 226 are to be included in the modified classification data 102(2), without calculating an importance score 220 using the scoring algorithms 222.

As another example, the classification rules 228 may indicate that a classification label 104 is to be included in the modified classification data 102(2) if the counts of accesses 206 for that classification label 104 exceeds a first threshold value 226, unless the count of child accesses 212 for a child label associated with the classification label 104 exceeds a second threshold value 226 indicative of a percentage of the counts of accesses 206. Continuing the example, the counts of accesses 206 for the classification label 104 "Athletic", associated with athletic shoes may include 180 accesses, which exceeds a threshold value 226 of 150. However, the count of accesses 206 for the child label "Running" may include 160 accesses, which is greater than eighty percent of the count of accesses 206 for the "Athletic" label. In such a case, the classification rules 228 may indicate that the classification data 102(1) is to be reorganized such that the "Running" label is a parent label with regard to the "Athletic" label. In other cases, the classification rules 228 may indicate that the "Athletic" label is to be excluded from the modified classification data 102(2). In some implementations, the threshold values 226 may be determined based on user input or preexisting default values. In other implementations, the threshold values 226 may be determined, using machine learning techniques, based on changes in user interaction data 120 over time. For example, threshold values 226 may vary dynamically over time, based on median values (e.g., associated with the fiftieth percentile of users) determined from user interaction data 120 at particular times. Continuing the example, certain classification labels 104, such as classification labels 104 associated with winter clothing, may be accessed more frequently during particular times of year, such as winter months, and infrequently during other months. Similarly, other classification labels 104 associated with other seasonal items may be accessed more and less frequently during particular times of year.

In some cases, user interaction data 120 for a newly-added classification label 104 may not exist, or insufficient user interaction data 120 may be present to determine an accurate importance score 220. In some implementations, classification labels 104 that were added to the classification data 102 within a threshold amount of time, such as within the previous thirty days, may be included in classification data 102 and used to classify items independent of the user interaction data 120 associated with the new classification label(s) 104. After the classification label 104 has existed for at least the threshold amount of time, the user interaction data 120 associated with that classification data 102 may be used to determine whether the classification label 104 may be subsequently included in or excluded from the classification data 102.

Figure 3:
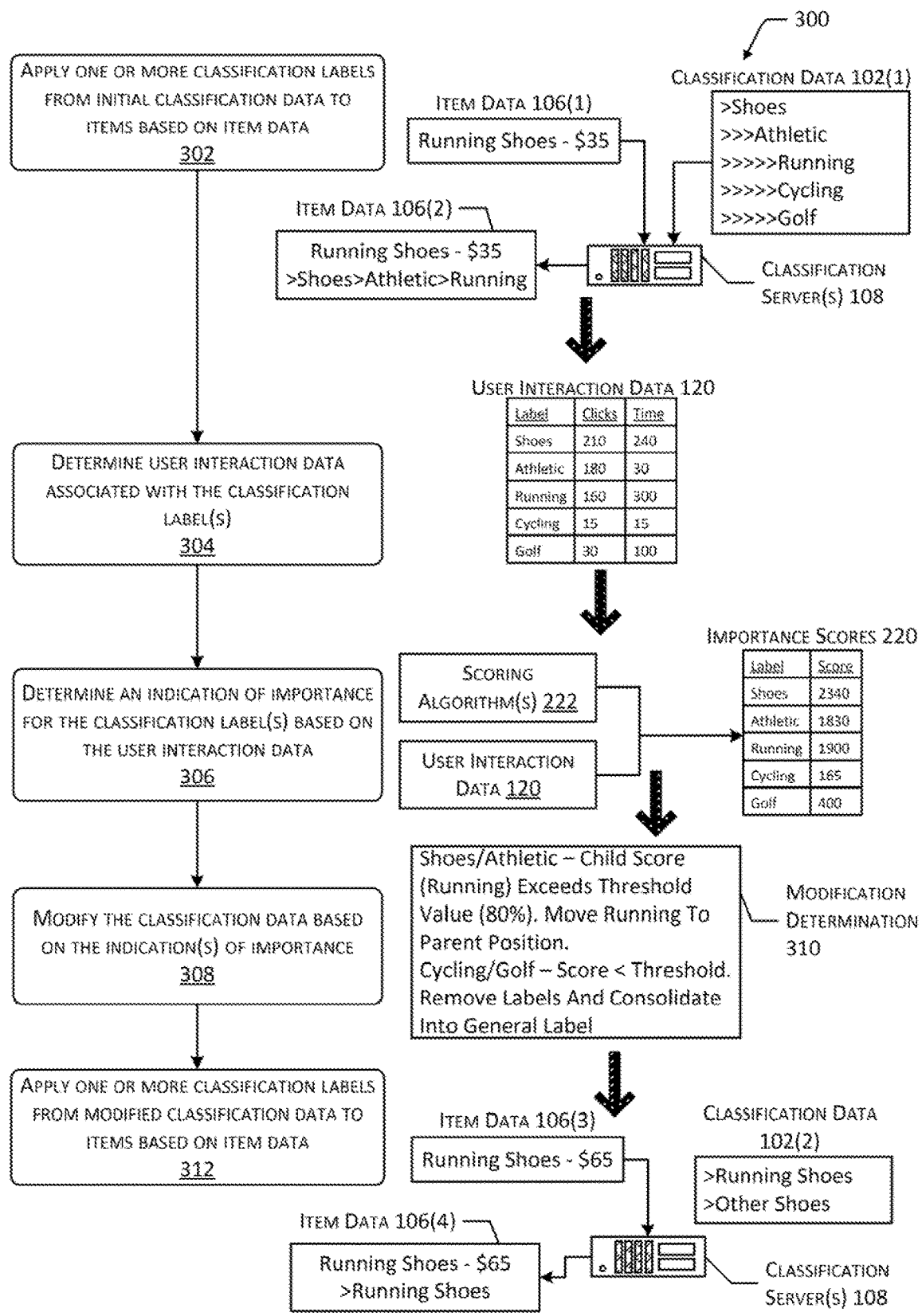
FIG. 3 depicts a scenario illustrating a method for modifying classification data based on user interaction data.

FIG. 3 depicts a scenario 300 illustrating a method for modifying classification data 102 based on user interaction data 120. At 302, one or more classification labels 104 from initial classification data 102(1) may be applied to items based on item data 106. For example, one or more classification servers 108 may receive first item data 106(1) associated with a new item to be added to an online marketplace or catalog. Continuing the example, the new item may be a type of running shoes, and the item data 106(1) may be indicative of terms or characteristics associated with running shoes. The classification server(s) 108 may access initial classification data 102(1) indicative of classification labels 104, one or more of which may correspond to the item data 106(1). For example, one or more classification labels 104 of the classification data 102(1) may include terms indicative of running shoes, such as "Shoes", "Athletic", and "Running". Based on the correspondence between at least a subset of the classification labels 104 and the item data 106(1), the classification server(s) 108 may apply the subset of the classification labels 104 to the item data 106(1), generating second item data 106(2) that includes the classification labels 104. For example, FIG. 3 depicts three classification labels 104 that are applied to the item data 106(1). Other classification labels 104 that do not correspond to the item data 106(1), such as classification labels 104 associated with other types of shoes (e.g., "Cycling" and "Golf"), or other types of non-shoe or non-clothing items, may not be applied to the item data 106(1) to generate the modified item data 106(2).

At 304, user interaction data 120 associated with the classification labels 104 may be determined. For example, a user interface 112 including at least a subset of the classification labels 104 may be provided to one or more user devices 114. The user devices 114 may interact with the classification labels 104, and user interactions 116 associated with these interactions may be determined. User interactions 116 may include, for example, user input selecting particular classification labels 104, time spent viewing or otherwise interacting with content associated with particular classification labels 104, and so forth. For example, FIG. 3 depicts example user interaction data 120 that indicates a count of accesses 206 for each depicted classification label 104 of the classification data 102(1) (e.g., "Clicks"), and a viewing time associated with each classification label 104 (e.g., "Time").

Figure 1B:
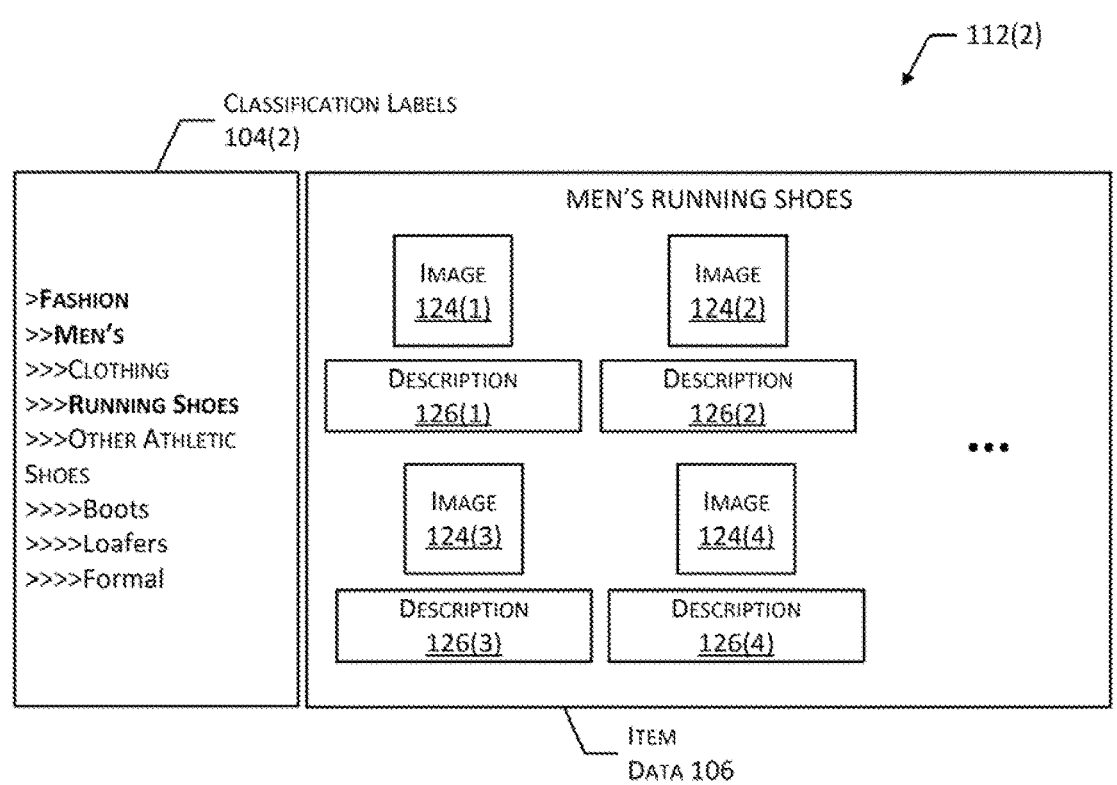

At 306, an indication of importance for the classification label(s) 104 may be determined based on the user interaction data 120. For example, as described with regard to FIGS. 1 and 2, the classification server(s) 108 may generate one or more importance scores 220, based on the user interaction data 120 and one or more scoring algorithms 222. In some implementations, the importance scores 220 may include numerical values, as depicted in the example importance scores 220 of FIG. 3. In other implementations, importance scores 220 may include other types of text, Boolean results, and so forth.

At 308, the classification data 102(1) may be modified based on the indication(s) of importance. For example, the classification server(s) 108 may generate a modification determination 310 based on the importance sores 220, one or more threshold values 226, one or more classification rules 228, and so forth. Continuing the example, FIG. 3 depicts a modification determination 310 in which the importance scores 220 of the labels for "Cycling" and "Golf" are less than a threshold score, and therefore will be removed from the classification data 120 and consolidated into a general label. Additionally, in the depicted modification determination 310, while the importance scores 220 for the "Shoes" and "Athletic" labels may exceed a threshold value 226, the importance score 220 for the child label "Running" exceeds a threshold value 226 of at least 80% of the importance scores 220 for the "Shoes" and "Athletic" labels. Therefore, the classification data 102 may be organized such that the "Running" label is in a parent position rather than a child position.

At 312, one or more classification labels 104 from the modified classification data 102(2) may be applied to items based on item data 106(3). For example, after modification of the classification data 102(2), item data 106(3) associated with a subsequent new item may be determined, such as a different pair of running shoes. The modified classification data 102(2) may include the labels "Running Shoes" and "Other Shoes" as parent labels. Based on correspondence between the item data 106(3) and the modified classification data 102(2), only a single classification label 104 may correspond to the item data 106(3), and thus, only that single classification label 104 would need to be applied to generate modified item data 106(4). Modification of the classification data 102 may avoid use of redundant, extraneous, or non-useful classification labels 104 while prioritizing classification labels 104 that are of use or interest, based on user interaction data 120.

Figure 4:
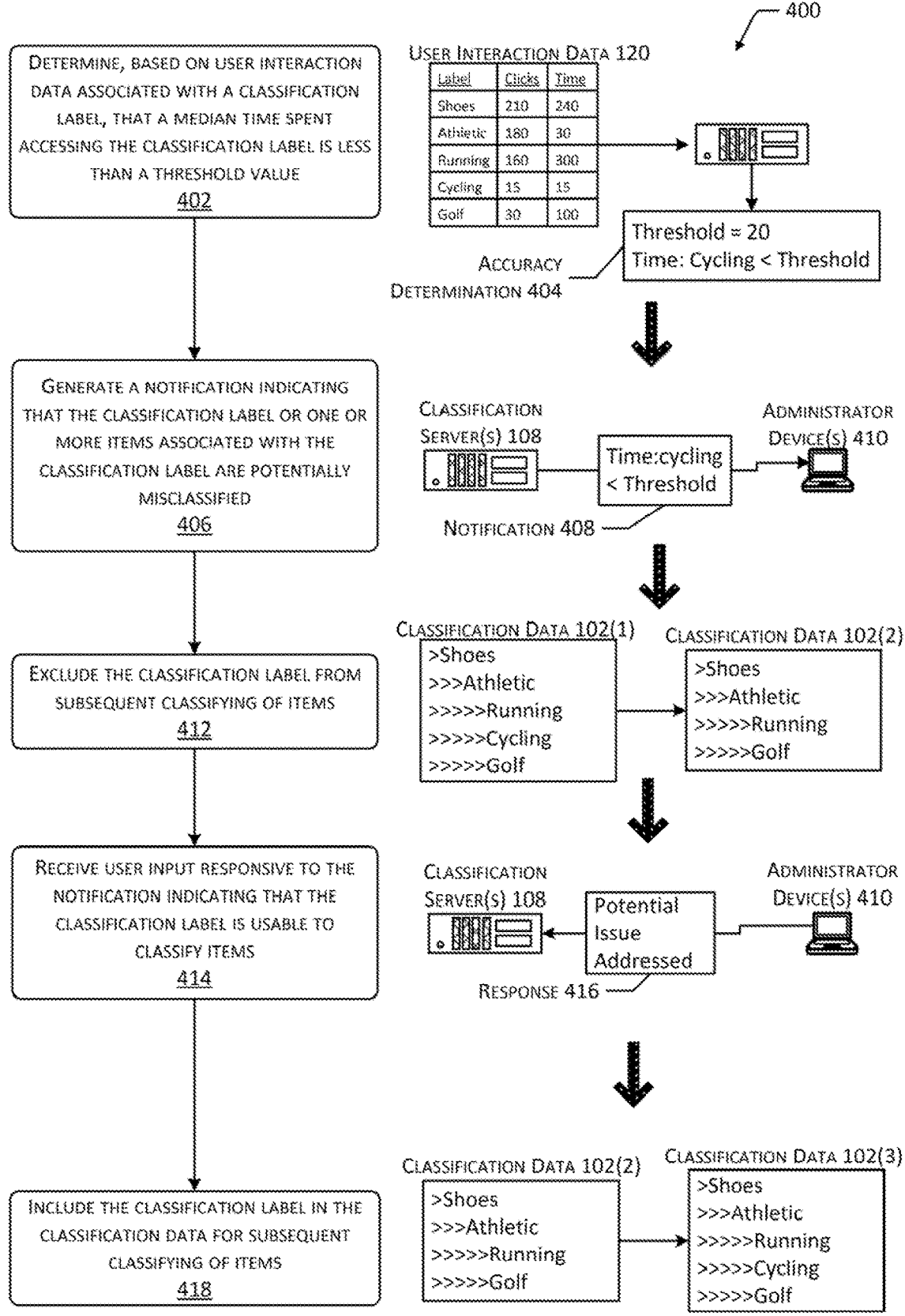
FIG. 4 depicts a scenario illustrating a method for determining potentially inaccurate classification labels or items based on user interaction data.

FIG. 4 depicts a scenario 400 illustrating a method for determining potentially inaccurate classification labels 104 or items based on user interaction data 120. At 402, based on user interaction data 120 associated with a classification label 104, it may be determined that a median (e.g., fiftieth percentile) time spent accessing the classification label 104 is less than a threshold value 226. For example, the user interaction data 120 may indicate one or more access times 208 associated with a classification label 104. The access time(s) 208 may include multiple individual access times 208 associated with different users, an average access time 208 (e.g., a mean, mode, or median) or total access time 208 determined based on the individual access times 208 of the users, and so forth. One or more threshold values 226 may include corresponding individual, average, or total threshold access times 208. If users spend less than a threshold amount of time viewing or otherwise interacting with the content associated with a classification label 104, this may indicate that the content is improperly classified or is not useful or interesting to users for other reasons. For example, FIG. 4 depicts example user interaction data 120 with an access time 208 of 15 for the label "Cycling" (e.g., "Time: Cycling"), which is less than a threshold value 226 of 20. Based on these values, the classification server(s) 108 may generate an accuracy determination 404 indicating that the "Cycling" label is potentially inaccurate, or that one or more items associated with the "Cycling" label are improperly classified or otherwise erroneous.

In some implementations, the classification server(s) 108 may also access item data 106 indicative of the items associated with the classification label 104. The item data 106 may also be used to generate the accuracy determination 404. For example, the item data 106 may indicate that the items associated with the classification label 104 are heterogeneous in nature, which may indicate that one or more items are improperly classified. Alternatively, the item data 106 may indicate that the items associated with the classification label 104 are homogeneous, which may indicate that the short access times 208 associated with the classification label 104 are occurring for reasons other than misclassified items.

At 406, the classification server(s) 108 may generate a notification 408 indicating that the classification label 104 or one or more items associated with the classification label 104 are potentially misclassified. In some implementations, the notification 408 may also include an indication of one or more particular items associated with the classification label 104 that are potentially misclassified or otherwise not useful or interesting, based on user interaction data 120 and the item data 106 associated with the items. The notification 408 may be provided to an administrator device 410 or another computing device associated with a user, device, or process that may review or correct potentially inaccurate classification labels 104 or items. In other implementations, the notification 408 may be stored in association with the classification server(s) 108 for subsequent review by a human user or automated process.

At 412, the classification label 104 may be excluded from use for subsequent classifying of items. For example, initial classification data 102(1) may include the "Cycling" label as a child label associated with the "Athletic" label, which is in turn a child label associated with the "Shoes" parent label. However, based on the accuracy determination 404, the "Cycling" label may be inaccurate or non-useful for other reasons. Because interaction with the "Cycling" label is not currently useful to users, the classification server(s) 108 may generate modified classification data 102(2) that excludes the "Cycling" label. Subsequent items that would correspond to the "Cycling" label may instead be associated with only the "Shoes" and "Athletic" labels.

At 414, user input responsive to the notification 408 may be received, that indicates that the classification label 104 is usable to classify items. For example, a user or automated process associated with the administrator device(s) 410 may review the classification label 104 or the item data 106 associated therewith and determine that no corrective action is required. As another example, the user or automated process may modify the classification labels 104 associated with one or more items, the manner in which items are classified using the classification label 104, and so forth. Independent of the manner in which the potential issue associated with the notification 408 is addressed, a response 416 may be received by the classification server(s) 108 indicating that the potential issue has been addressed or resolved. In some implementations, item data 106 indicative of the items associated with the classification label 104 may be accessed to determine whether the items are generally homogeneous or heterogeneous in nature. For example, if an automated process determines that the items are homogeneous in nature, this may indicate that the items are not improperly classified, and the response 416 to the notification 408 may be provided. If an automated process determines that the items are heterogeneous in nature, the classification label 104 may be flagged for additional review, such as by a human user.

At 418, based on the response 416, the classification label 104 may be included in the classification data 102 for subsequent classifying of items. For example, the "Cycling" label may be added to the modified classification data 102(2) to generate third classification data 102(3), which includes the "Cycling" label. Subsequent items that correspond to the "Cycling" label may have that classification label 104 applied thereto for classifying the items.

Figure 5:
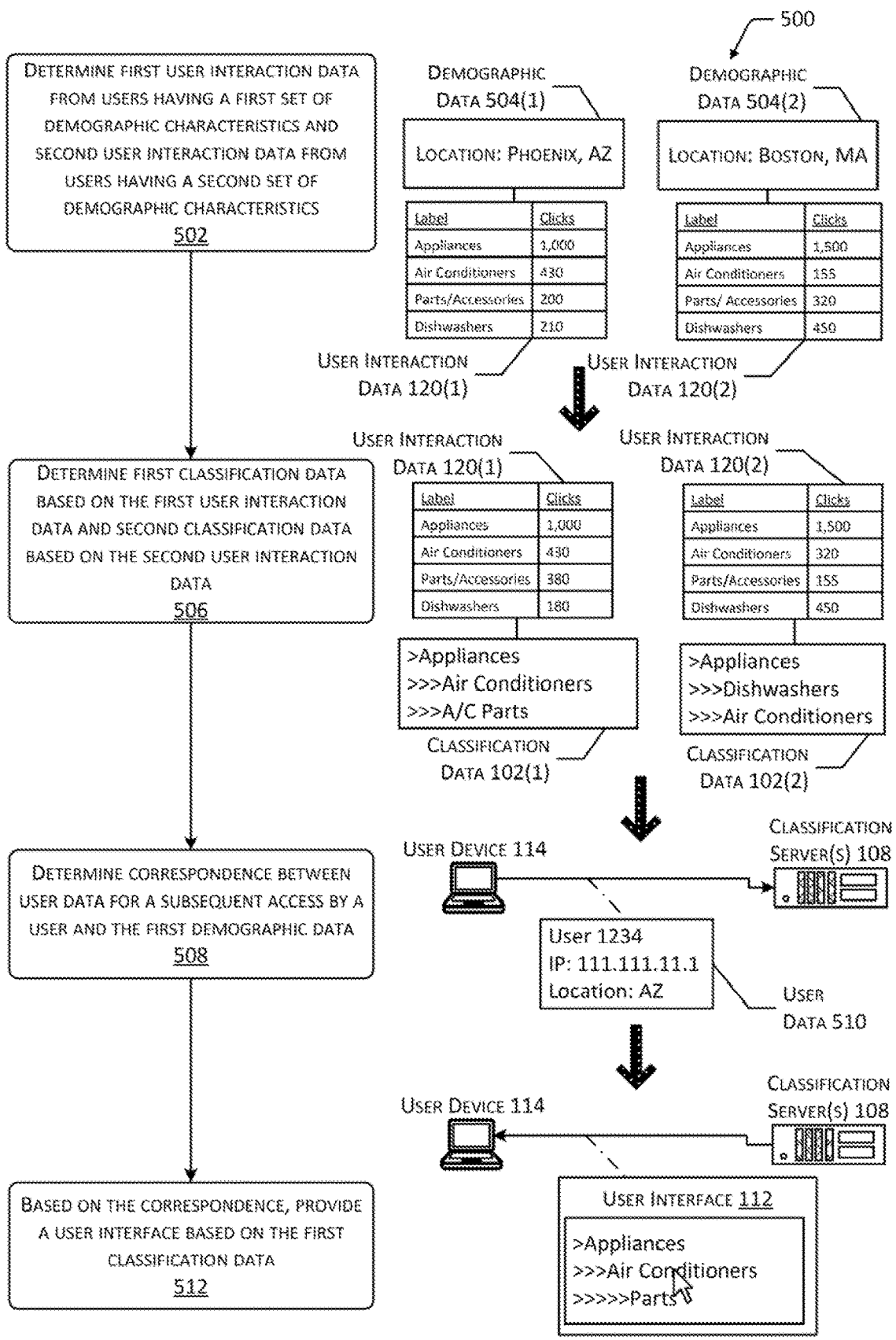
FIG. 5 depicts a scenario illustrating a method for determining multiple sets of classification data based on user demographic characteristics.

FIG. 5 depicts a scenario 500 illustrating a method for determining multiple sets of classification data 102 based on user demographic characteristics. At 502, first user interaction data 120(1) associated with users having a first set of demographic characteristics and second user interaction data 120(2) associated with users having a second set of demographic characteristics may be determined. For example, first demographic data 504(1) may be determined from a first set of users and second demographic data 504(2) may be determined from a second set of users. Each set of demographic data 504 may indicate one or more characteristics of the associated set of users. Demographic data 504 may be determined based on user interactions 116 associated with a classification label 104, that may be attributed to user account. For example, when accessing an online marketplace or catalog, a user may log into a user account associated with various information, such as a user name, address, sex, date of birth, and so forth. In other cases, information regarding a user may be determined using characteristics of the user interaction 116, such as an Internet protocol (IP) or other network address associated with the communication, one or more characteristics of the user device 114, and so forth. For example, the geographic location of a user device 114 accessing an online marketplace or catalog may be determined based on the IP address associated with the user device 114.

Demographic data 504 determined from user interactions 116 may be used to classify and group users based on various elements of the demographic data 504. For example, users may be grouped based on sex, age, geographic location, or other factors. In some implementations, machine learning may be used to determine groupings and associations of users having common demographic characteristics and common user interactions 116 with regard to one or more classification labels 104. For example, FIG. 5 depicts example first demographic data 504(1) associated with users residing in Phoenix, Ariz., and second demographic data 504(2) associated with users residing in Boston, Mass. While the depicted example demographic data 504 identifies locations associated with one or more users, in other implementations, demographic data 504 may include a set of characteristics common to a group of users, such as age, sex, location, and so forth. First user interaction data 120(1) associated with the first demographic data 504(1) may indicate that users residing in Phoenix more frequently accessed classification labels 104 related to air conditioners, and less frequently accessed classification labels 104 related to dishwashers. Second user interaction data 120(2) associated with the second demographic data 504(2) may indicate that users residing in Boston more frequently accessed classification labels related to dishwashers and less frequently accessed classification labels related to air conditioners.

At 506, first classification data 102(1) based on the first user interaction data 120(1) and second classification data 102(2) based on the second user interaction data 120(2) may be determined. For example, FIGS. 1-3 describe example methods by which classification data 102 may be determined based on user interaction data 120. FIG. 5 depicts example first user interaction data 120(1) in which three classification labels 104, "Appliances", "Air Conditioners", and "Parts/Accessories" have received a substantial number of accesses, such as greater than 200 "Clicks". Therefore, the three classification labels 104 may be included in the first classification data 102(1). However, the counts of accesses 206 for the "Parts/Accessories" child label may be within a threshold quantity or percentage of the "Air Conditioners" parent label. Because the count of accesses 206 for the "Dishwashers" label is below a threshold quantity, the "Dishwashers" label may be excluded. Thus, the first classification data 102(1) may include a hierarchy of classification labels 104 that includes "Appliances", "Air Conditioners", and "A/C Parts". While the "Dishwashers" label may be excluded from the classification data 102, subsequent items that may have been classified using this label may be classified using the "Appliances" label.

FIG. 5 also depicts example second user interaction data 120(2), in which the "Appliances", "Air Conditioners", and "Dishwashers" labels received at least a threshold quantity of accesses, such as 200 "clicks", while the "Parts/Accessories" label did not. The second classification data 102(2) may therefore exclude the "Parts/Accessories" label while including the other classification labels 104.

At 508, correspondence between user data 510 for a subsequent user access and the first demographic data 504(1) may be determined. For example, when a user device 114 subsequently accesses an online marketplace or catalog associated with the classification server(s) 108, user data 510 associated with the user or the user device 114 may be determined. Continuing the example, the user data 510 may include user account information associated with the user or data associated with the user device 114, such as an IP address. Based on the user data 510, it may be determined that the user device 114 is located in Arizona, which corresponds to the first demographic data 504(1).

At 512, based on the correspondence between the user data 510 and first demographic data 504(1), a user interface 112 based on the first classification data 102(1) may be provided to the user device 114. For example, responsive to the determination that a user device 114 is located in Arizona, a user interface 112 that includes accessible classification labels 104 based on the first classification data 102(1) (e.g., "Appliances", "Air Conditioners", "Parts") may be generated and provided to the user device 114. While FIG. 5 depicts two example sets of classification data 102, any number of sets of classification data 102 may be determined for any number of user characteristics that may be determined using demographic data 504. For example, different sets of customized classification trees that may be used to browse available items may be presented to different user devices 114 based on the demographic information associated with the user devices 114.

While FIG. 5 depicts an example user interface 112 that may include elements of classification data 102(1), item data 106, and so forth, in other implementations, a user interface 112 may include a series of prompts or questions without visually presenting the classification data 102(1) to a user device 114. For example, the user interface 112 may include a first question, such as "Are you interested in purchasing clothing", and receipt of user input indicating an affirmative answer to this question may be stored as user interaction data 120 indicating a user interaction 116 with the classification label 104 for "Clothing". Based on the user interaction 116 associated with the first question, a second question relating to a child label associated with the "Clothing" label may be presented. Additional questions may be presented based on the user input received responsive to preceding questions.

Figure 6:
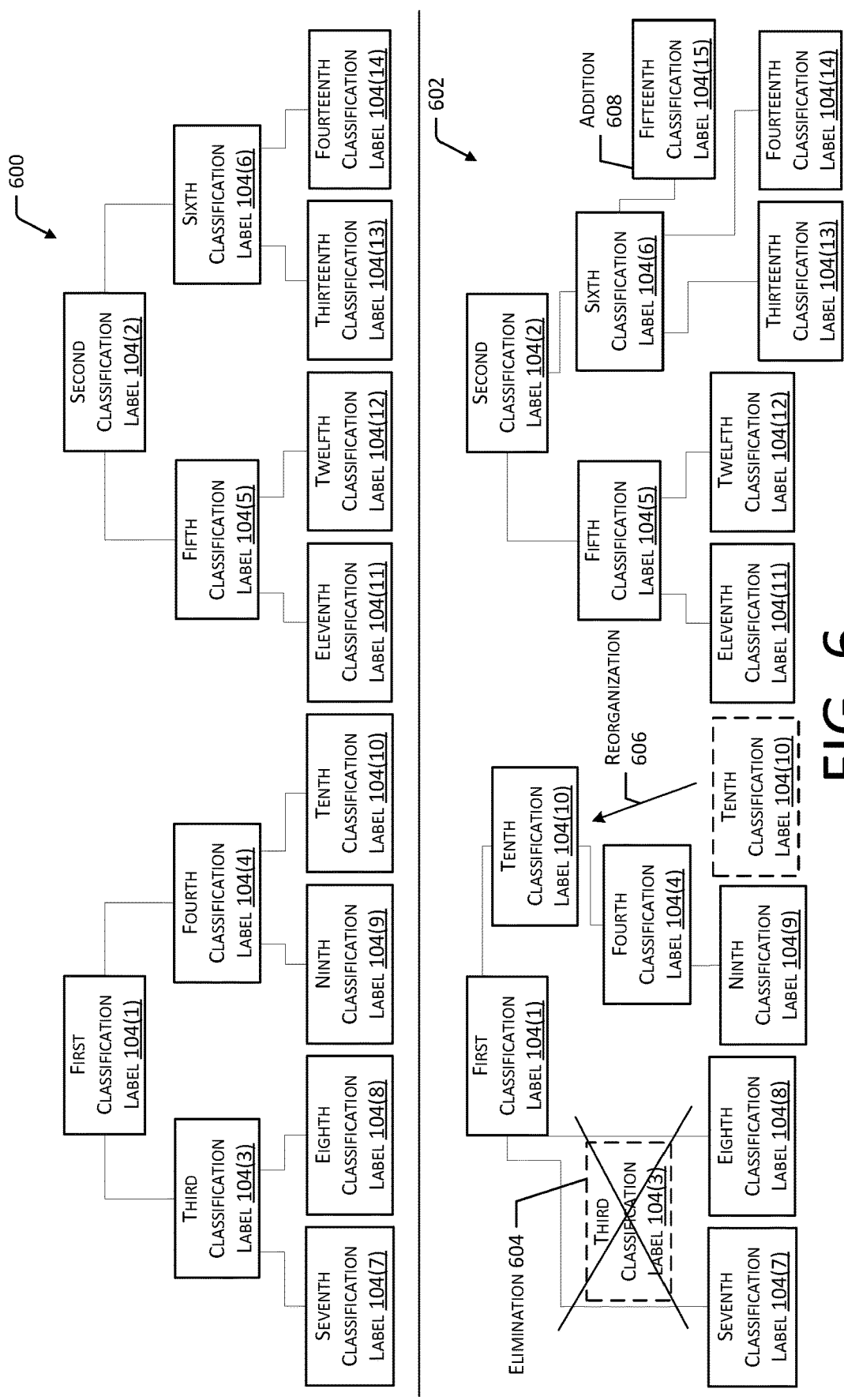
FIG. 6 illustrates example classification tree structures associated with classification data and possible modifications to the tree structures.

FIG. 6 illustrates example classification tree structures associated with classification data and possible modifications to the tree structures. Specifically, FIG. 6 depicts a first classification tree structure 600 that includes fourteen example classification labels 104 and a second classification tree structure 602 generated by performing various modifications to the first classification tree structure 600.

A first classification label 104(1) and second classification label 104(2) may include parent labels, having one or more child labels associated therewith. For example, the first classification label 104(1) and second classification label 104(2) may be associated with general categories of items, such as "Electronics" or "Clothing". The third classification label 104(3) and fourth classification label 104(4) are child labels with regard to the first classification label 104(1). The fifth classification label 104(5) and sixth classification label 104(6) are child labels with regard to the second classification label 104(2). Each child label may be associated with a sub-category of items. For example, the third classification label 104(3) may be associated with "Cameras", while the fourth classification label 104(4) is associated with "Cellular Telephones and Accessories". Continuing the example, the fifth classification label 104(5) may be associated with "Boots", while the sixth classification label may be associated with "Sneakers".

The seventh classification label 104(7) and eighth classification label 104(8) are child labels with regard to the third classification label 104(3), and the ninth classification label 104(9) and tenth classification label 104(10) are child labels with regard to the fourth classification label 104(4). The eleventh classification label 104(11) and the twelfth classification label 104(12) are child labels with regard to the fifth classification label 104(5), and the thirteenth classification label 104(13) and fourteenth classification label 104(14) are child labels with regard to the sixth classification label 104(6). Each of the seventh through fourteenth classification labels 104 may be associated with more specific categories of items, such as "Video Cameras", "Wireless Cameras", "Phone Cases", "Phone Chargers", "Hiking Boots", "Fishing Boots", "Running Shoes", and "Cycling Shoes".

In some cases, the classification data 102 may be modified in a manner that results in an elimination 604 of one or more classification labels 104. For example, if a count of accesses 206 for a particular parent label is below a threshold value, or if the count of accesses 206 for one or more child labels associated with that parent label is within a threshold quantity or percentage of that parent label, the parent label may be of limited use to users. Continuing the example, the second classification tree structure 602 illustrates an elimination 604 of the third classification label 104(3). Subsequent to this elimination 604, the seventh classification label 104(7) and eighth classification label 104(8) are child labels with regard to the first classification label 104(1).

In other cases, the classification data may be modified in a manner that results in a reorganization 606 of one or more classification labels 104. For example, a count of accesses 206 for a particular child label may exceed or fall within a threshold quantity or percentage of the accesses associated with a parent label. This may indicate that the child label is of greater use or interest to users. As a result, the classification labels 104 may be reorganized such that the child label is a parent label with regard to the label that was previously a parent to the child label. FIG. 6 illustrates a reorganization 606 in which the tenth classification label 104(10), which was originally a child label with regard to the fourth classification label 104(4), has been moved such that it is a parent label with regard to the fourth classification label 104(4) and a child label with regard to the first classification label 104(1).

In some cases, modification of the classification data 102 may include an addition 608 of one or more classification labels 104. For example, the thirteenth classification label 104(13) may relate to "Running Shoes" and the fourteenth classification label 104(14) may relate to "Cycling Shoes". However, a large number of search queries, item purchases, or other interactions with the sixth classification label 104(6), relating to "Sneakers", may indicate a user interest in fashion sneakers. Because items associated with the sixth classification label 104(6) are generally heterogeneous in nature (e.g., including many types of sneakers), the classification data 102 may be modified to add an additional fifteenth classification label 104(15) associated with "Fashion Sneakers". The fifteenth classification label 104(15) may be a child label with regard to the sixth classification label 104(6).

Figure 7:
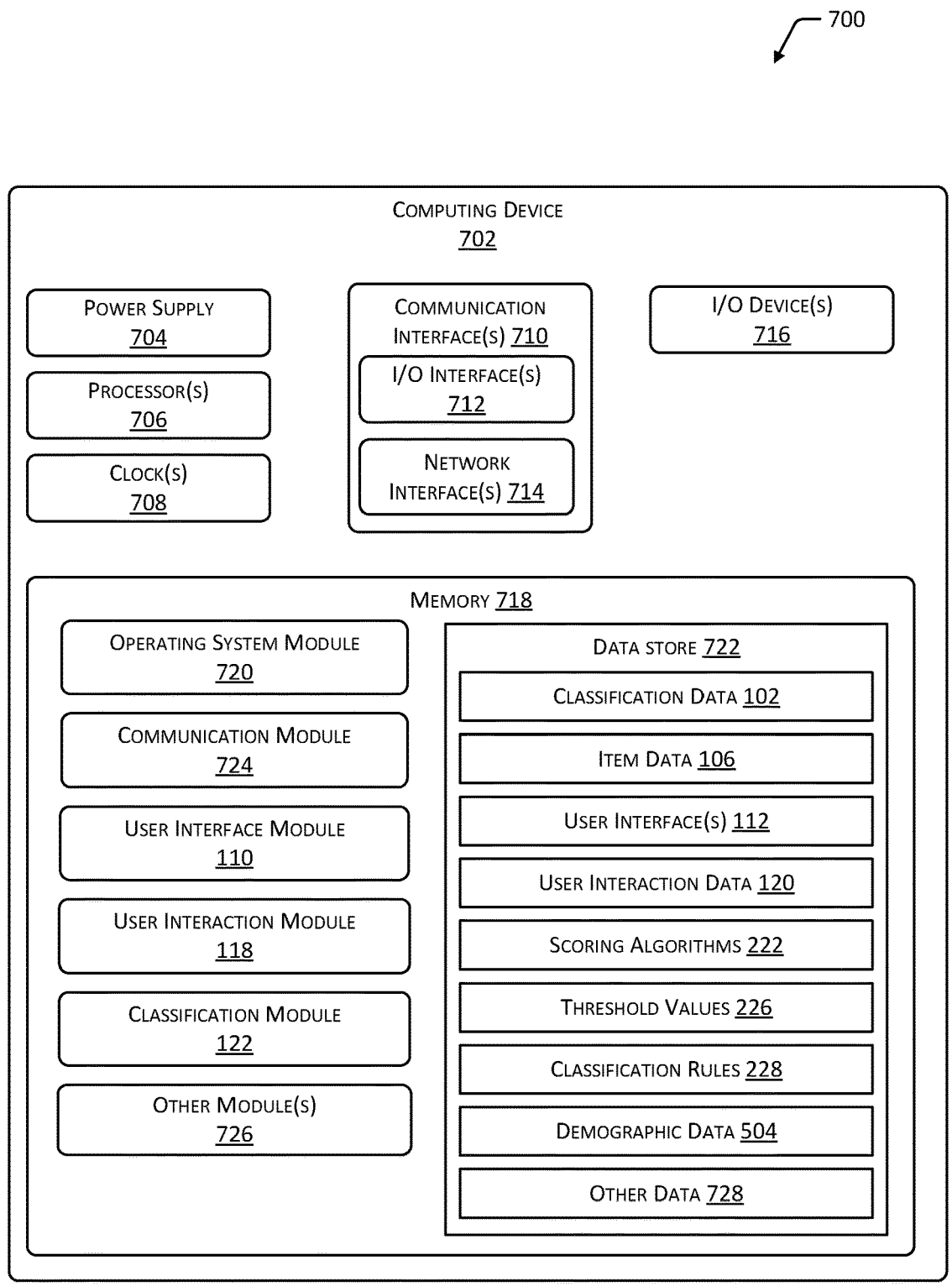
FIG. 7 is a block diagram depicting an implementation of a computing device within the scope of the present disclosure.

FIG. 7 is a block diagram 700 depicting an implementation of a computing device 702 within the scope of the present disclosure. The computing device 702 may include any number of classification servers 108, user devices 114, administrator devices 410, or any other types of computing devices 702 including, without limitation, laptop computers or other personal computers, smartphones or other mobile devices, set-top boxes, tablet computers, wearable computers, automotive computers, servers, and so forth.

One or more power supplies 704 may be configured to provide electrical power suitable for operating the components of the computing device 702. In some implementations, the power supply 704 may include a rechargeable battery, fuel cell, photovoltaic cell, power conditioning circuitry, and so forth.

The computing device 702 may include one or more hardware processor(s) 706 (processors) configured to execute one or more stored instructions. The processor(s) 706 may include one or more cores. One or more clocks 708 may provide information indicative of date, time, ticks, and so forth. For example, the processor(s) 706 may use data from the clock 708 to generate a timestamp, trigger a preprogrammed action, and so forth.

The computing device 702 may include one or more communication interface(s) 710, such as input/output (I/O) interface(s) 712, network interface(s) 714, and so forth. The communication interfaces 710 may enable the computing device 702, or components of the computing device 702, to communicate with other computing devices 702 or components thereof. The I/O interface(s) 712 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 712 may couple to one or more I/O device(s) 716. The I/O devices 716 may include any manner of input device or output device associated with the computing device 702 or with another computing device 702 in communication therewith. For example, I/O devices 716 may include touch sensors, keyboards, mouse devices, microphones, image sensors (e.g., cameras), scanners, displays, speakers, haptic devices, printers, motion sensors, location sensors, and so forth. In some implementations, the I/O device(s) 716 may be physically incorporated with a computing device 702 or may be externally placed.

The network interface(s) 714 may be configured to provide communications between the computing device 702 and other devices, such as the I/O devices 716, routers, access points, wireless communication devices 104, destination devices 106, and so forth. The network interface(s) 714 may include devices configured to couple to one or more networks, including local area networks (LANs), wireless LANs, wide area networks (WANs), wireless WANs, and so forth. For example, the network interfaces 714 may include computing devices 702 compatible with Ethernet, Wi-Fi, Wi-Fi Direct, Bluetooth, Bluetooth Low Energy, ZigBee, Z-Wave, 3G, 4G, LTE, and so forth.

The computing device 702 may include one or more busses or other internal communications hardware or software that allows for the transfer of data between the various modules and components of the computing device 702.

As shown in FIG. 7, the computing device 702 may include one or more memories 718. The memory 718 may include one or more computer-readable storage media (CRSM). The CRSM may be any one or more of an electronic storage medium, a magnetic storage medium, an optical storage medium, a quantum storage medium, a mechanical computer storage medium, and so forth. The memory 718 may provide storage of computer-readable instructions, data structures, program modules, and other data for the operation of the computing device 702. A few example modules are shown stored in the memory 718, although the same functionality may alternatively be implemented in hardware, firmware, or as a system on a chip (SoC).

The memory 718 may include one or more operating system (OS) modules 720. The OS module 720 may be configured to manage hardware resource devices such as the I/O interfaces 712, the network interfaces 714, the I/O devices 716, and to provide various services to applications or modules executing on the processors 706. The OS module 720 may implement a variant of the FreeBSD operating system as promulgated by the FreeBSD Project; UNIX or a UNIX-like operating system; a variation of the Linux operating system as promulgated by Linus Torvalds; the Windows® operating system from Microsoft Corporation of Redmond, Wash., USA; or other operating systems.

A data store 722 and one or more of the following modules may also be stored in the memory 718. The modules may be executed as foreground applications, background tasks, daemons, and so forth. The data store 722 may use a flat file, database, linked list, tree, executable code, script, or other data structure to store information. In some implementations, the data store 722 or a portion of the data store 722 may be distributed across one or more other devices including other computing devices 702, network attached storage devices, and so forth.

A communication module 724 stored in the memory 718 may be configured to establish communications with user devices 114, administrator devices 410, or other computing devices 702.

The memory 718 may also store the user interface module 110. The user interface module 110 may be configured to determine a particular user interface 112 to provide to a user device 114 based on classification data 102. For example, the classification data 102 may include multiple classification labels 104 and label relationships 202 indicative of parent, child, and sibling relationships between the classification labels 104. Continuing the example, based on the classification labels and label relationships 202, the user interface 112 may include one or more accessible parent labels that, when accessed, cause one or more child labels to become accessible, and so forth. In some implementations, item data 106 may also be included in the user interface 112. For example, when a classification label 104 is accessed, item data 106 indicative of the items associated with that classification label 104 may be determined and provided in the user interface 112.

In some implementations, the user interface module 110 may also be configured to determine user data 510 associated with a user device 114 or user interaction 116 and determine correspondence between the user data 510 and demographic data 504. For example, one or more sets of classification data 102 may correspond to particular sets of demographic data 504. Responsive to the determination of user data 510 that corresponds to particular demographic data 504, a user interface 112 based on the classification data 102 associated with that demographic data 504 may be provided.

The memory 718 may also store the user interaction module 118. The user interaction module 118 may be configured to determine user interactions 116 associated with the classification labels 104 presented in a user interface 112. For example, the user interaction module 118 may determine each instance that a particular classification label 104 is selected. The user interaction module 118 may also determine the length of time that content associated with a particular classification label 104 has been viewed or otherwise accessible to a user device 114. In some implementations, the user interaction module 118 may be configured to determine search queries responsive to which particular classification labels 104 or item data 106 are output. The user interaction module 118 may also be configured to determine label relationships 202 based on the classification data 102 and determine counts of parent accesses 210 and counts of child accesses 212 for one or more classification labels 104. The user interaction module 118 may store at least a subset of the determined user interactions 116 as user interaction data 120.

The memory 718 may additionally store the classification module 122. The classification module may be configured to generate classification data 102 or modify existing classification data 102 based on user interaction data 120. For example, the classification module 122 may determine correspondence between one or more elements of user interaction data 120 for a particular classification label 104 and one or more threshold values 226. Based on the correspondence, the particular classification label 104 may be included in or excluded from the classification data 102. One or more classification rules 228 may indicate the manner in which classification data 102 is to be generated or modified based on correspondence between the user interaction data 120 and the threshold values 226. In some implementations, the classification module 122 may be configured to determine an importance score 220 for a particular classification label 104, then determine correspondence between the importance score 220 and a threshold score. The importance score 220 may be based on the user interaction data 120 and one or more scoring algorithms 222, which may associate various weights, constants, or other factors with elements of the user interaction data 120 to determine a numerical value or other type of value.

In some implementations, the classification module 122 may be configured to access demographic data 504 associated with one or more groups of users and determine particular user interaction data 120 associated with each set of demographic data 504. The classification module 122 may then generate multiple sets of classification data 102 based on each set of user interaction data 120. As discussed previously, based on user data 510 associated with a subsequent user device 114 or user interaction 116, the user interface module 110 may then determine demographic data 504 that corresponds to the user data 510 and generate a user interface 112 based on the classification data 102 associated with the demographic data 504.

Other modules 726 may also be present in the memory 718. For example, encryption modules may be used to encrypt and decrypt communications between computing devices 702. A user account module may be configured to determine user data 510 associated with various user devices 114 and store demographic data 504 determined from the user data 510. Machine learning modules may be configured to determine relationships between the user interaction data 120 associated with particular elements of demographic data 504 or to determine one or more threshold values 226. Data analysis modules may be configured to provide reports or other data indicative of at least a portion of the user interaction data 120 determined with regard to particular items or classification labels 104.

Other data 728 within the data store 722 may include user input data, such as configurations and settings associated with computing devices 702. Other data 728 may also include security data, such as encryption keys and schema, access credentials, and so forth. Other data 728 may additionally include one or more algorithms used to determine threshold values 226. For example, threshold values 226 may vary dynamically as user interaction data 120 changes over time. Continuing the example, threshold values 226 may include median values based on user interaction data 120 for a particular time period. As another example, threshold values 226 may be determined based on user interaction data 120 determined for a historic time period that corresponds to the current time. Continuing the example, user interaction data 120 determined during a previous winter season may be used to determine a threshold value 226 for use during a current winter season.

In different implementations, different computing devices 702 may have different capabilities or capacities. For example, classification servers 108 may have significantly more processor 706 capability and memory 718 capacity compared to the processor 706 capability and memory 718 capacity of user devices 114.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access classification data that includes a plurality of labels associated with a plurality of items;
determine user interaction data associated with one or more user interfaces presenting the plurality of labels, wherein the user interaction data is indicative of:
a first count of instances that user input selecting a particular label was received and respective times that each instance of the first count of instances occurred;
a second count of a subset of the first count of instances that occurred subsequent to a search query;
a third count of instances that user input selecting a parent label associated with the particular label was received;
one or more fourth counts of instances that user input selecting one or more child labels associated with the particular label was received; and
a length of time during which one or more users interacted with the particular label;
based on the user interaction data, determine an importance score for one or more labels of the plurality of labels;
determine at least a subset of the plurality of labels having an importance score greater than a threshold value;
modify the classification data to form modified classification data, wherein the modified classification data associates the at least a subset of the plurality of labels with automatic classification of items;
receive item data indicating characteristics of an item to be classified;
determine correspondence between the characteristics of the item and one or more labels of the at least a subset of the plurality of labels;
based on the correspondence, automatically apply the one or more labels of the at least a subset of the plurality of labels to the item; and
modify at least a subset of the one or more user interfaces based on the modified classification data.

2. The system of claim 1, further comprising computer-executable instructions to:
based on the first count, the third count, and the one or more fourth counts, modify the classification data by one or more of:
excluding the parent label for automatic classification of items;
excluding at least one child label for automatic classification of items;
excluding the particular label for automatic classification of items;
reorganizing the plurality of labels such that the parent label is a child label associated with the particular label;
reorganizing the plurality of labels such that the at least one child label is a parent label associated with the particular label; or
generating one or more new labels.

3. The system of claim 1, further comprising computer-executable instructions to:
determine the first count to exceed a threshold count;
determine the length of time to be less than a threshold length of time;
generate a notification associated with the particular label, the notification indicating a potential misclassification associated with the particular label and indicating one or more items associated with the particular label;
exclude the particular label from use during automatic classification of items;
receive user input responsive to the notification; and
modify the classification data to indicate that the particular label is to be used for automatic classification of items.

4. The system of claim 1, further comprising computer-executable instructions to:
determine item data indicative of items associated with the particular label;
based on the item data, determine at least a subset of the plurality of items to have characteristics unique to the plurality of items; and
based on the characteristics, include at least one child label associated with the particular label in the classification data for use during automatic classification of items.

5. A method comprising:
determining user interaction data for a plurality of labels, wherein the user interaction data is indicative of a first count of instances that user input associated with a first label was received and one or more times that at least a subset of the first count of instances occurred;
based on the user interaction data, including the first label in classification data, wherein the classification data associates at least a subset of the plurality of labels with automatic classification of items;
determining one or more second counts of instances associated with receipt of user input accessing one or more second labels associated with the first label;
determining that at least one second count of the one or more second counts is greater than the first count;
based on the at least one second count being greater than the first count, modifying the classification data by modifying a relationship between the first label and the one or more second labels by one or more of:
replacing the first label with at least one of the one or more second labels; or
reorganizing the plurality of labels to cause at least one of the one or more second labels to be a parent label associated with the first label;
receiving item data associated with an item to be classified;
determining correspondence between the item data and the first label; and based on the classification data, associating the first label with the item data.

6. The method of claim 5, further comprising:
determining second user interaction data indicative of one or more of:
a count of instances that user input associated with a second label was received; or
a length of time during which one or more users interacted with the second label; and
based on correspondence between the second user interaction data and a threshold value, excluding the second label from the classification data.

7. The method of claim 5, further comprising:
determining demographic data associated with the user interaction data, the demographic data indicating characteristics of users that interact with the first label;

determining correspondence between a first portion of the demographic data and a first portion of the user interaction data;
determining correspondence between a second portion of the demographic data and a second portion of the user interaction data;
determining a first subset of the plurality of labels that corresponds to the first portion of the user interaction data;
generating first classification data that includes the first subset of the plurality of labels;
determining a second subset of the plurality of labels that corresponds to the second portion of the user interaction data;
generating second classification data that includes the second subset of the plurality of labels;
determining user data associated with a user accessing the plurality of labels;
determining correspondence between the user data associated with the user and the first portion of the demographic data; and
providing access to the first subset of the plurality of labels.

8. The method of claim 5, wherein the user interaction data further includes a length of time during which one or more users interacted with the first label, the method further comprising:
determining the length of time to be less than a threshold length of time; and
based on the determination, generating a notification associated with the first label.

9. The method of claim 5, wherein the user interaction data includes a length of time during which one or more users interacted with the first label, the method further comprising:
determining the length of time to be less than a threshold length of time;
determining item data indicative of characteristics of a plurality of items associated with the first label;
based on the item data, determining that the plurality of items is heterogeneous; and
generating a notification associated with the first label.

10. The method of claim 5, wherein the user interaction data is further indicative of:
a third count of instances that user input selecting a third label associated with the first label was received; or
a count of a subset of the first count of instances that occurred subsequent to a search query.

11. The method of claim 5, wherein the user interaction data further includes one or more search queries, the method further comprising:
determining item data indicative of items associated with the first label;
determining correspondence between at least one of the one or more search queries and the item data; and
based at least in part on the correspondence, including the first label in the classification data.

12. A system comprising:
one or more memories storing computer-executable instructions; and
one or more hardware processors to execute the computer-executable instructions to:
access classification data including a plurality of labels associated with a plurality of items;
access user interaction data indicative of user input accessing the plurality of labels;
access demographic data indicative of characteristics of users associated with the user input;
determine correspondence between a first portion of the demographic data and a first portion of the user interaction data;
determine that the first portion of the user interaction data exceeds one or more threshold values;
determine a first subset of the plurality of labels associated with the first portion of the user interaction data;
generate first classification data including the first subset of the plurality of labels;
determine user input associated with the plurality of labels;
determine correspondence between user data associated with the user input and the first portion of the demographic data; and
provide a first user interface, wherein one or more labels of the first subset of the plurality of labels are accessible from the first user interface.

13. The system of claim 12, further comprising computer-executable instructions to:
determine correspondence between a second portion of the demographic data and a second portion of the user interaction data;
determine a second subset of the plurality of labels associated with the second portion of the user interaction data;
generate second classification data that includes the second subset of the plurality of labels; and
responsive to user input that corresponds to the second portion of the demographic data, provide a second user interface, wherein one or more labels of the second subset of the plurality of labels are accessible from the second user interface.

14. The system of claim 12, wherein the user interaction data is further indicative of a length of time during which one or more users interacted with the plurality of labels, the system further comprising computer-executable instructions to:
determine that a length of time during which the one or more users interacted with a particular label of the plurality of labels is less than a threshold length of time;
generate a notification associated with the particular label;
exclude the particular label from the first classification data;
receive user input responsive to the notification;
determine that a count of accesses associated with the particular label exceeds the one or more threshold values; and
include the particular label in the first classification data.

15. The system of claim 12, further comprising computer-executable instructions to:
determine item data indicative of characteristics of a plurality of items associated with a particular label of the plurality of labels;
based on the item data, determine that the plurality of items is heterogeneous;
determine one or more child labels associated with the particular label;
include the one or more child labels in the first classification data for automatic classification of items; and
exclude the one or more child labels from the first user interface.

16. The system of claim 12, further comprising computer-executable instructions to:

determine, based on the user interaction data, one or more scores for the first subset of the plurality of labels;

wherein at least one of the one or more threshold values includes a threshold score.

17. The system of claim 12, further comprising computer-executable instructions to:

determine a first count of accesses associated with a particular label of the first subset of the plurality of labels;

determine a second count of accesses for a parent label associated with the particular label; and based on the first count of accesses exceeding the second count of accesses by at least a threshold count, excluding the parent label from the first classification data.

18. The system of claim 12, further comprising computer-executable instructions to:

determine a first count of accesses associated with a particular label of the first subset of the plurality of labels;

determine a second count of accesses for a child label associated with the particular label; and based on the second count of accesses exceeding the first count of accesses by at least a threshold count, modify the first classification data such that the child label is a parent label with regard to the particular label.

19. The system of claim 12, further comprising computer-executable instructions to:

receive item data associated with an item to be classified;

determine correspondence between the item data and at least one label of the first subset; and associating the at least one label with the item data.

20. The method of claim 5, further comprising:

accessing demographic data indicative of characteristics of users that interact with the first label;

determining correspondence between a first portion of the demographic data and a first portion of the user interaction data;

determining a first subset of the plurality of labels that corresponds to the first portion of the user interaction data;

generating first classification data that includes the first subset of the plurality of labels;

determining user data associated with a user accessing the plurality of labels;

determining correspondence between the user data associated with the user and the first portion of the demographic data; and providing access to the first subset of the plurality of labels.

* * * * *